United States Patent [19]
Michel et al.

[11] 3,751,672
[45] Aug. 7, 1973

[54] OPTO-ELECTRONIC APPARATUS FOR MEASURING AND CONTROLLING THE CONCENTRATION OF SOLUTIONS

[75] Inventors: Alfred Michel, Erlangen; Werner Rummel, Grossdechsendorf, both of Germany

[73] Assignee: Siemens Aktiengesellschaft, Munich, Germany

[22] Filed: Apr. 28, 1972

[21] Appl. No.: 248,388

[30] Foreign Application Priority Data
May 3, 1971 Germany.................. P 21 21 744.7

[52] U.S. Cl.................. 250/218, 250/227, 356/136
[51] Int. Cl............................................ G01n 21/46
[58] Field of Search.................. 250/218; 356/227, 356/133, 135–137

[56] References Cited
UNITED STATES PATENTS

| | | | |
|---|---|---|---|
| 2,394,949 | 2/1946 | Straat...................... | 356/136 |
| 2,807,976 | 10/1957 | Vossberg...................... | 250/218 X |
| 3,520,619 | 7/1970 | Ward...................... | 356/133 X |
| 3,526,771 | 9/1970 | Henkel et al. ...................... | 250/218 |
| 3,639,770 | 2/1972 | Zizelman...................... | 250/218 |

Primary Examiner—Walter Stolwein
Attorney—Hugh A. Chapin

[57] ABSTRACT

An improved opto-electronic apparatus for determining the concentration of solutions includes a probe having a prismatic immersion tip with at least two internally reflecting surfaces. A light-emitting means in the probe body directs a collimated beam of light through the prism toward a first reflecting surface of the probe tip, the incident beam making an angle with the first reflecting surface approximately equal to a critical angle of total reflection corresponding to the nominal index of refraction of the solution being examined. The included angle between subsequent reflecting surfaces is preferably approximately at least twice this critical angle. The light beam is reflected from a last reflecting surface toward an adjacent light receiving surface optically connected with a light-sensitive means in the probe body. Variations in the concentration of the solution in which the probe tip is immersed affect the intensity of the light beam finally reflected to the light-sensitive means, and the amplified output of the light-sensitive means provides a voltage suitable for use in measuring and controlling the concentration of the solution.

22 Claims, 15 Drawing Figures

OPTO-ELECTRONIC APPARATUS FOR MEASURING AND CONTROLLING THE CONCENTRATION OF SOLUTIONS

FIELD OF THE INVENTION

The invention concerns opto-electronic apparatus for measuring and/or controlling the concentration of solutions operating according to the principle of total reflection of a light ray.

DESCRIPTION OF THE PRIOR ART

It is known that by measuring the critical angle of total reflection at the interface between a prism of known refractive index and a liquid, the index of refraction of the liquid can be determined. This is the principle of operation of immersion refractometers in which light enters the liquid from optically denser glass with a known index of refraction.

U.S. Pat. No. 3,526,771 issued on Sept. 1, 1970 to Henkel et al. and assigned to the assignee of the present invention discloses a device for measuring and controlling the concentration of solutions by utilizing the known relationship between concentration of a solution and its index of refraction. A prism which has a larger index of refraction than the solution to be examined is placed on the surface of the solution whose concentration is to be measured or controlled. Near the prism a movable light source beams a light ray with adjustable angle of incidence onto the boundary surface between the solution and the prism. The light source is adjusted so that, within the control errors permissible at lower solution concentrations, the angle of incidence is smaller than the critical angle of total reflection. A device for adjusting the concentration is operated by means of a control. Photoelectric transducers in the ray paths of the reflected and the refracted light transmit electrical signals to the control.

Higher sensitivity than that provided by the Henkel et al. device is desirable for many applications. Furthermore, devices of compact construction are often required. Finally, such devices should be easy to manufacture and should have a wide spectrum of applications.

It is an object of the invention to provide an improved opto-electronic apparatus for measuring and/or controlling the concentration of solutions by means of a probe which operates according to the principle of total reflection of a light ray and, in particular, is a compact device of high sensitivity adaptable to a variety of applications.

SUMMARY OF THE INVENTION

The opto-electronic apparatus of the invention has an elongated probe body with a prismatic tip having at least two reflecting surfaces. In operation the probe tip is immersed into the solution to be examined. The first reflecting surface of the probe tip is inclined with respect to the longitudinal axis of the probe body, and the reflecting surfaces of the probe tip which are successively hit by the light ray form approximately an angle of $2\alpha_T$, where $\alpha_T$ is the critical angle of total reflection at the interface between the solution to be examined and the material of the probe tip, relative to the average concentration of the solution to be examined. In the probe body near the first reflecting surface of the probe tip there is a light-transmitting surface, and near the last reflecting surface of the probe tip there is a light-receiving surface. The probe tip preferably has sufficient reflecting surfaces so that the light beam is reflected from the last surface toward the light-receiving surface in a direction approximately reversed from the direction of the beam sent from the light-emitting surface toward the first reflecting surface. Stated otherwise, the number of reflecting surfaces in the probe tip should be enough to produce a total reflection angle of preferably at least approximately 180°.

Electrical leads connect light-emitting means to a power supply unit and light-sensitive means to a measuring amplifier. The light-emitting means in turn is optically connected to the light-transmitting surface, and the light-sensitive means is connected optically to the light-receiving surface.

The light-transmitting surface is understood to be a light source which emits light in a preferred direction. In the opto-electronic apparatus according to the invention, the light is directed preferably toward the first reflecting surface of the probe extension.

Because only the probe tip needs to be brought into contact with the solution to be examined, the great advantage of small immersion depth results, and because the probe tip has at least two reflecting surfaces, increased sensitivity is obtained. Furthermore, because the probe body contains the light-emitting and light-sensitive means, all essential components of the opto-electronic apparatus are combined in a compact unit with small dimensions.

The light-transmitting surface, which is arranged in the probe body near the first reflecting surface of the probe extension to avoid difficulties caused by stray light, is preferably the end face of a light pipe optically connnected with a light-emitting means such as luminescent diode. The use of a light pipe is of advantage in cases where the light source proper, such as a light-emitting diode, might be damaged if disposed in the immediate vicinity of the first reflecting surface due to elevated temperature of the solution to be examined, for example. Alternatively, other light sources can be used as the light-emitting means such as focused incandescent lamps. The light pipes can be conventional optical guide rods or optical fiber bundles.

As most light sources, including light-emitting diodes, radiate divergent instead of parallel light beams, a focusing lens can be arranged in the ray path for collimating the light beam from the light-emitting means. The light-receiving surface, which is arranged in the probe body of the opto-electronic apparatus near the last reflecting surface of the probe extension, is preferably the end face of a light pipe optically connected with the light-sensitive means, such as a photodiode. The light pipe here is similar to the light pipe used in connection with the light source. A silicon photodiode is a preferred light-sensitive means; however, the light-sensitive means can also be another conventional photoelectric element, for instance, a photoresistor.

The probe of the opto-electronic apparatus may be constructed in various ways. Preferably, a flat, multi-angled probe tip is cut from a preformed bar, polished at the reflecting surfaces, and is inserted into a mounting in the probe body. A suitable bonding agent, such as casting resin, mades a good mechanical and optical connection. The probe may have a separate cylindrical body provided with a recess for the probe tip and holes or recesses for receiving the light-emitting and the light-sensitive means and their electrical leads. The probe body and the probe tip may also be made in one integral piece by injection molding or casting.

Methacrylic acid ester (such as is sold under the trademarks Plexiglas or Plexigum), polystyrene, polysulfone or glass are suitable materials for both the probe body and the probe tip. However, other suitable materials can also be used in the manufacture of the probes. The selection of suitable probe materials depends primarily on the application of the opto-electronic apparatus and the solution to be examined.

By using inexpensive injection-moldable materials, such as polystyrene, for the probe, the opto-electronic apparatus according to the invention can be made in mass production and at low cost. By varying the angle between reflecting surfaces of the probe tip, and also by varying the material of the probe tip, liquid solutions having a wide range of refractive indices can be analyzed or controlled. For all these reasons, the apparatus according to the invention is suitable as a universal measuring and control device, for instance, for monitoring the electrolyte in electrochemical cells or for the control of electrolyte concentrators in fuel cell batteries. The device is furthermore suitable for monitoring the acid density in storage batteries, particularly by means of data processing installations, to which the measured value determined by the device can be fed.

With the aid of the following graphs and drawings of preferred embodiments the invention will be explained in further detail.

DESCRIPTION OF THE PREFERRED EMBODIMENT

If a light ray enters from a medium with a higher index of refraction $n_1$ into a medium with a lower index of refraction $n_2$, the critical angle of total reflection $\alpha_T$ is given by the equation:

$$\sin \alpha_T = n_2/n_1.$$

As mentioned earlier, the probe tip of the opto-electronic apparatus according to the invention advantageously has enough reflecting surfaces so that the light beam striking the light-sensitive surface after the multiple total reflection has a course at least approximately reversed from that of the light beam from the light-emitting surface.

With values of $n_1 = 1.48$ for Plexiglas and $n_2 = 1.38$ for a 6 mol/liter solution of potassium hydroxide (6 m KOH), for example, the critical angle of total reflection is calculated as $\alpha_t = 68°36'$. The complement angle $(90° - \alpha_T)$ is $21°24'$, i.e., about one-quarter of a right angle $(22°30')$. Thus, a probe tip having four or five reflecting surfaces will produce an approximately reverse course for the light beam striking the light-receiving surface with respect to the light beam from the light-transmitting surface for commonly encountered concentrations of acid or alkaline solutions.

Figure 1:
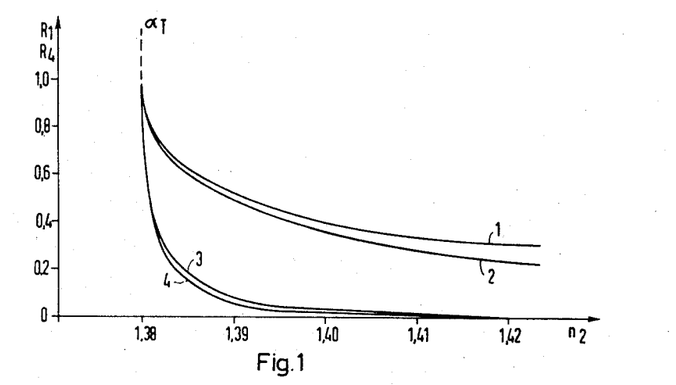
FIG. 1 graphically illustrates the relation between the intensity of the reflected light component and the index of refraction of the solution being examined.

FIG. 1 shows theoretical curves for intensity of the reflected light component as a function of the index of refraction for single and quadruple reflection, the critical angle of total reflection being $\alpha_T = 68°36'$ ($n_1 = 1.48$ for Plexiglas, $n_2 = 1.38$ for 6 m KOH). The index of refraction $n_2$ of the medium to be investigates is plotted on the abscissa, and the intensity of the reflected light for single ($R_1$) and gradruple ($R_4$) reflection is on the ordinate. The curves are based on the assumption that in the incident light the components which vibrate parallel and perpendicular to the plane of incidence are equal.

Curves 1 and 2 apply for single reflection and show the intensity of the reflected light with a plane of vibration parallel and perpendiular, respectively, to the plane of incidence. Curves 3 and 4 show the corresponding intensities for quadruple reflection.

The presentation shows that the intensity of the reflected light decreases much more rapidly for quadruple reflection than for single reflection as the critical angle of total reflection is exceeded, i.e., as the index of refraction $n_2$ of the medium to be investigated increases, so that the sensitivity of a multiple reflecting probe tip is substantially increased over single reflection tip.

Strictly speaking, the theoretical curves of FIG. 1 apply only for ideal, parallel light. As almost always slightly divergent light is present if conventional light sources are used, small deviations of the angle of incidence result, so that the reflected light is composed of components whose angles of incidence lie in a narrow region around the critical angle of total reflection. This phenomenon naturally shows most strongly in the steeply decaying parts of the curves and tends to flatten them. Although this flattening reduces sensitivity slightly, it has the beneficial effect of expanding the measuring range. If high sensitivity is desired, the slope of the curves can be controlled by collimating the light beam with suitable lenses.

Figures 2A, 2B, 2C:
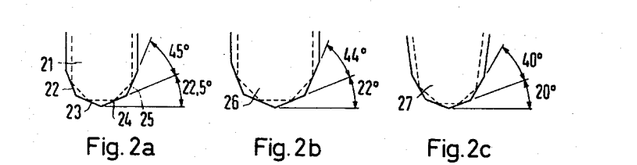
FIGS. 2a to 2c show different embodiments of probe tips for multiple total reflection, FIG. 3, FIG. 4 and FIG. 5 graphically illustrate the opto-electric characteristics of different embodiments of the invention.

FIGS. 2a to 2c show flat, multi-angled probe tips in side view, each having four reflecting surfaces but with different included angles. The light ray path through each tip is shown by dashed lines. Flat, multi-angled probe tips have the advantage over other possible embodiments that they can be manufactured more easily, either alone or together with the probe body. U-shaped probe tips, for example, have the disadvantage that poor parallelism of the two legs can result in uncontrollable errors. The probe tip 21 of FIG. 2a is designed for a critical angle of 67.5°; i.e., the angle between the reflecting surfaces 22, 23, 24, and 25 is always 2 $\alpha_T = 135°$. The probe tips 26 of FIG. 2b and 27 of FIG. 2c are laid out for critical angles of total reflection of 68° and 70°, respectively. The angle between each of the reflecting surfaces is here 136° and 140°, respectively.

Figure 3:
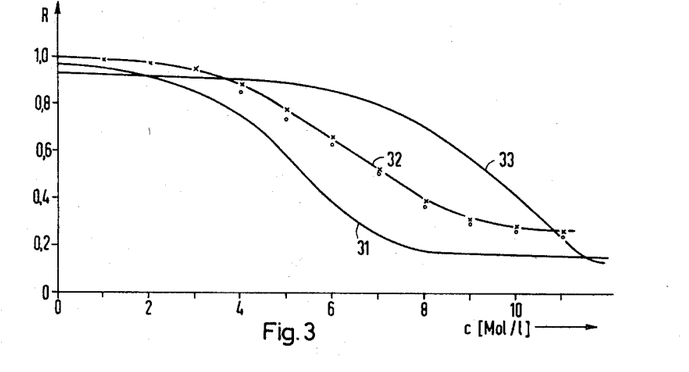

FIG. 3 shows curves of intensity versus concentration obtained with the probe tips shown in FIG. 2 for potassium hydroxide solutions of different concentrations. On the abscissa is plotted the concentration $c$ of the potassium hydroxide in mol/liter, and on the ordinate is the intensity R of the reflected light. Curve 31 was obtained by using probe tip 21, curve 32 with probe tip 26, and curve 33 with probe tip 27.

To normalize the intensity measurements, the voltage values for the individual probe tips in air were measured. For this reason, the values for the intensity of $c = 0$ mol/liter, corresponding to pure water, deviate slightly from each other.

The light-sensitive means in each case was a silicon photodiode (Type BPY 11) cemented into the probe body; both focused incandescent lamps and light-emitting diodes were used as light-emitting means. The light source was always cemented into the probe body. A vacuum tube voltmeter served as the measuring amplifier.

In order to be unaffected by ambient light, measurements can advantageously also be made by pulsing the light-emitting diodes and using a tuned amplifier to measure the output of the light-sensitive means. Advantageously, the tuned amplifier may be equipped with inductorless filters for this purpose and a temperature-compensating arrangement. In addition, a resonant amplifier with low input impedance is preferred.

The measurements were preformed by immersing the probe tip into potassium hydroxide solutions of different concentrations contained in a tank of black plastic. With a continuous light source, the ambient light component was no more than 4 percent. The relatively steep portions of the curves show a distinct displacement in the direction toward higher concentrations with increasingly lower angle of incidence, i.e., with increasing angle between the reflecting surfaces of the respective probe extension.

Curve 32, corresponding to probe tip 26, provides the best match to the concentration range of about 6 mol of KOH per liter. This is the usual concentration range of the electrolytic liquid in fuel cells and in fuel cell batteries with alkaline electrolytes. By means of different symbols, curve 32 also reveals that the measurement points deviate slightly from each other when using light from a focused-bulb, 300 mA, incandescent lamp (symbol $o$) as compared with light from a 30mA light-emitting diode with radiation in the infrared region (symbol $x$).

Further measurements were performed with an opto-electronic apparatus having a probe tip 26 according to FIG. 2b. The results shown graphically in FIG. 4. On the ordinate is again plotted the intensity of the reflected light, and on the abscissa the concentration $c$, in Mol/liter, of potassium hydroxide or sulfuric acid. The intensities at $c = 0$ mol/liter were measured in pure water.

Figure 4:
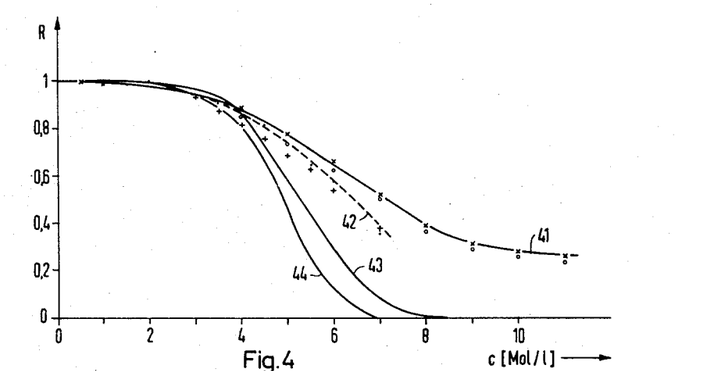

Curve 41 corresponds to curve 32 in FIG. 3. It shows values obtained through measurements on KOH by means of both a light-emitting diode (diode current: 30mA; impedance of the measuring amplifier, i.e., vacuum tube voltmeter: $10^{13}$ ohm; intensity $R = 1 \triangleq 328$ mV; symbol: $x$) and an incandescent lamp (current: 300 mA; resistance of the measuring amplifier: $10^{13}$ ohm; intensity $R = 1 \triangleq 347$ mV; symbol: $o$). Curve 42 shows the results obtained under the same conditions with a light emitting diode (symbol: $\cdot$) and an incandescent lamp (symbol: $+$) for measurements on $H_2SO_4$. When continuous light is used (either incandescent lamp or light-emitting diode), the curves 41 and 42 have approximately the same shape; curve 42 for sulfuric acid is merely displaced slightly toward somewhat lower mol concentrations.

The advantage of pulsing the light-emitting means and of using a tuned voltmeter to evaluate the signals from the light-sensitive means is shown by curves 43 and 44 in comparison with curves 41 and 42. Curve 43, like curve 41, applies for KOH, and curve 44, like curve 42, applies for $H_2SO_4$. Both curves 43 and 44 were obtained with a light-emitting diode pulsed with alternating current at a frequency of 20kHz. The measured values for curves 43 and 44 were in each case obtained with a resonant amplifier having an input impedance of 10 kohm. The intensity $R = 1$ corresponds in the case of curve 43 to a voltage of 6.5 V, and in the case of curve 44, to a voltage of 6.6 V. For a-c (pulsed) light, as for continuous light, the curves for potassium hydroxide and sulfuric acid have approximately the same shape, but the measured curves for a-c light are much steeper than those for continuous light.

It may be seen from curve 43 that in this case the most favorable operating range of the opto-electronic apparatus used for the measurement is around a KOH concentration of 5.5 mol/liter. As the value $R = 1$ corresponds to a voltage of 6.5 V, and a voltage difference of about 0.5 V is necessary to operate a relay, it follows that with an opto-electronic apparatus of this type, control can be exercised to within a value of about $5.5 \pm 0.1$ mol/liter for example.

In the opto-electronic apparatus according to the invention, the photodiode can advantageously be followed by a variable shunt resistor and a measuring amplifier, wherein through adjustment of the shunt resistor the operating range of the probe can be matched to the concentration range of the solution to be monitored. The advantages obtainable thereby will be demonstrated with the aid of FIG. 5.

Figure 5:
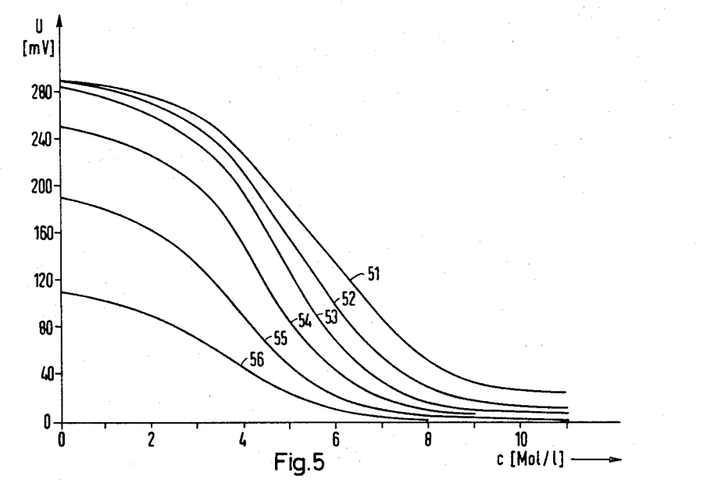

FIG. 5 shows graphically measurement curves which were obtained using an opto-electronic apparatus with a probe tip 26 as shown in FIG. 2b for measurements on potassium hydroxide. On the abscissa is plotted the concentration $c$ of potassium hydroxide in mol/liter, and on the ordinate, the measured voltage U in mV. A vacuum tube voltmeter (resistance $10^{13}$ ohm) served as the measuring amplifier, and different shunt resistors were connected across the photodiode. The curves were obtained with a light-emitting diode used in the d-c (continuous) light mode.

Curve 51 shows the results of a comparative measurement without a shunt resistor. Curves 52 to 56 show the results obtained with shunt resistors of 100 kohms, 47 kohms, 22 kohms, 10 kohms and 4.7 kohms, respectively. It is found that the inversion point of the characteristic curves, starting with curve 51 (vacuum tube voltmeter with a resistance of $10^{13}$ ohm), is displaced toward lower concentrations with lower values of the shunt resistor across the photodiode. With a low-resistance load, the initial voltage is also diminished.

The dependence of the characteristic curve of the probe on the load resistance, as demonstrated by FIG. 5, brings with it important advantages. By different settings of a shunt resistor, the measuring range of a single opto-electronic apparatus can be changed and expanded, particularly toward lower concentration ranges. Moreover, if the values of many opto-electronic devices are to be compared with one another, for which purpose the characteristic of all probes should be the same, all probes can be trimmed to the same characteristic by means of adjusting a high resistance. Finally, the maximum value for the voltage can also be fitted to given requirements by various means, for instance, by a series resistance.

If the measurements, the results of which are shown graphically in FIG. 5, are performed not on potassium hydroxide but on sulfuric acid of different concentrations, i.e., different densities, one obtains with the corresponding shunt resistors curves of nearly identical shape as in the measurements on potassium hydroxide. These curves are therefore not shown separately. For example, curve 54 in FIG. 5, obtained with a shunt resistor of 22 kohms, corresponds remarkably well to the curve obtained using an opto-electronic apparatus of this kind in sulfuric acid having a density range of about 1.1 to 1.35 g/cm$^3$ at 20°C, corresponding to a range of concentrations from about 1.5 to 6.5 mol/liter. This is the range of interest in lead storage batteries, as it covers the charged as well as the discharged condition. By means of the opto-electronic apparatus according to the invention the charge condition of storage batteries can therefore be monitored and determiend in an excellent manner as a function of the acid concentration, which drops during the discharging process.

The opto-electronic apparatus according to the invention is thus equally suited for measuring and/or controlling the concentration of acid and alkaline solutions. To this end, the probe tips may have, as was already explained, advantageously four or five reflecting surfaces, the total deflection of the beam of light being approximately 180°. Such probe tips therefore have so many reflecting surfaces that the light beam striking the light-receiving surface takes an at least approximately reverse course to the light beam emanating from the light-transmitting surface.

Figure 6:
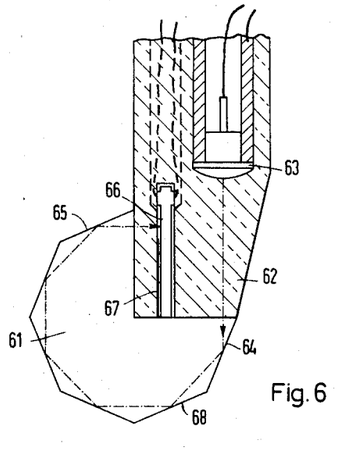
FIG. 6 is a partial section view of a probe with a probe tip providing sextuple total reflections.

In some cases, it may be an advantage if the probe extension has so many reflecting surfaces that the light beam strikes the light-receiving surface at least approximately perpendicular to the light beam emanating from the light-transmitting surface. To this end, the probe tip may have preferably six reflecting surfaces, so that the total deflection of the light beam is approximately 270°. A probe with such a probe tip is shown in FIG. 6, with the path of the light beam indicated by dash-dotted lines. A probe body 62 is here cemented into a recess of a probe tip 61, so that the light beam emanating from a light-emitting diode 63 strikes a first reflecting surface 64 after entering probe tip 61 and, upon leaving probe tip 61 after reflection from last reflecting surface 65, strikes a light-sensitive means, i.e., a photodiode 66. The light-emitting diode 63 and photodiode 66, together with their leads, are arranged in respective holes in the probe body 62. Photodiode 66 is partly covered with black paint 67. Opto-electronic devices with a sextuple totally-reflecting probe extension can serve, for instance, for determining the concentration of storage battery acid or of sea water.

On the other hand, the probe tip of the present invention can have as few as two reflecting surfaces; so that the light beam is deflected after the last reflecting surface by a total of approximately 90°. There is no separate drawing of such a tip, but the arrangement can be demonstrated with the aid of probe tip 61 of FIG. 6 by visualizing that the light beam would leave tip 61 after reflection from second reflecting surface 68 and would strike a light-sensitive means (not shown).

Figure 7:
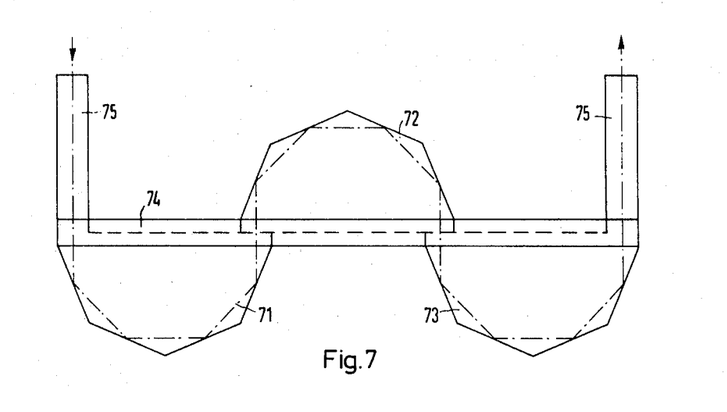
FIG. 7 shows a probe tip arrangement having reflecting surfaces in cascade.

The reflecting surfaces of the probe tip of an opto-electronic apparatus according to the invention may also be arranged advantageously in a cascade, where the light beam is guided in a wave-like fashion. Such a probe tip is shown in FIG. 7. By multiplying the totally-reflecting surfaces by cascading (there are 12 totally-reflecting surfaces in the embodiment of FIG. 7), a considerable increase in sensitivity can be obtained. Opto-electronic devices with such probe extensions are suited particularly for tests on aqueous solutions such as sea water. In FIG. 7, parts of the probe tip, each with four reflecting surfaces, are designated by 71, 72, 73, and are cemented to a common carrier 74. Carrier 74 is provided with mountings 75, by which the probe tip is attached in recesses of the associated probe body.

The solutions to be tested, the concentration of which is to be measured and/or controlled, may have temperatures which considerably exceed normal room temperature. For example, fuel cells and fuel cell batteries with alkaline electrolytes, such as KOH, are operated at temperatures of up to 90°C and higher. To assure high operational reliability even at elevated temperatures, a temperature compensating element advantageously may be connected in series with the light-emitting diode for compensating the temperature dependence of the light-emitting diode and or the photo-diode. The light-emitting diode and the temperature-compensating element optionally may be accommodated together in a housing, either in the probe body or mounted on the probe body. In the latter case one end of a light pipe connected with the light-emitting diode then serves as the light-transmitting surface. The housing for the light-emitting diode and the temperature-compensating element may to advantage additionally be thermally connected with a heat sink or a cooling device.

Light-emitting diodes exhibit a steep drop of the emitted light flux with temperature. In addition, irreversible damage occurs in light-emitting diodes at temperatures above 80° to 90°C over a period of time. These probelms are eliminated by using temperature compensating elements in conjunction with light pipes. The preferred temperature-compensating elements are thermistors. Thermistors may consist, for instance, of a mixture of different metal oxides and exhibit a negative resistance-temperature coefficient.

Commercially available thermistors Type K 11 (Siemens AG), having a resistance of about 200 Ohm at room temperature, can compensate the temperature dependence of the light-emitting diode and the photo-diode, one thermistor for each, the two thermistors being connected in series.

Advantageously, a resonant amplifier with low input impedance may be used at the same time, as the temperature dependence of the short-circuit current of the photodiode is slight. In this case a thermistor with low resistance can also be used.

Figure 8:
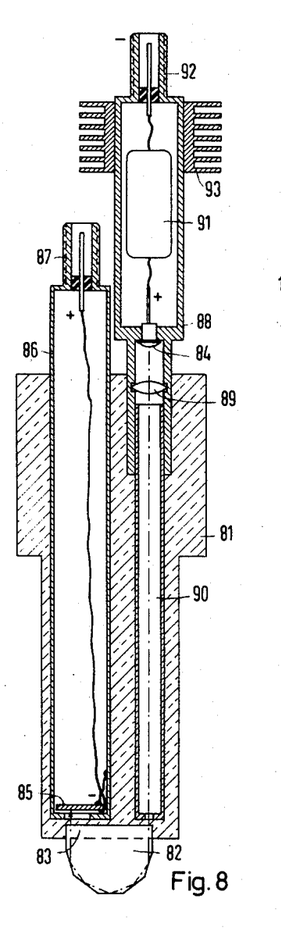
FIG. 8 is an alternate probe embodiment.

FIG. 8 shows schematically a probe of an opto-electronic apparatus according to the invention, which serves particularly for the testing of alkaline solutions, such as KOH. The probe body 81 and the probe extension 82 are made of Plexiglas. The diameter of the probe body 81, which is cylindrical, increases in the upper portion. The probe has, for example, the following dimensions. The diameter of the lower probe body is about 15 mm, and about 20 mm in the enlarged region; the probe body is about 50 mm long. Probe tip 82 is of flat, multi-angled design and is cemented into a recess 83 in the probe body about 1 to 2 mm deep. Probe tip 82 has five reflecting surfaces and is laid out for a critical angle of total reflection of 72°. The free part of probe tip 82 has a length of about 5 to 6 mm. The width of probe tip 82 is about 10 mm at the base, and its thickness is about 2 to 3 mm, however, the tip may be thicker. The immersion depth of the probe extension is thus about 5 mm., i.e., the probe tip of this invention has the advantage of very small immersion depth.

The embodiment of the opto-electronic apparatus according to FIG. 8 has the further advantage that the input and output leads of the light-emitting diode 84 and the photo-diode 85, respectively, are shielded against high-frequency interference. To this end, both light-emitting diode 84 and photodiode 85 as well as their leads are each mounted in metal housings, for instance, steel. The housing 86 for photodiode 85 is located almost completely within probe body 81. The protruding part of housing 86 is equipped with a high-frequency connector 87. The housing 88 for light-emitting diode 84, which may be of the same material as housing 86, extends only partialy into probe body 81. This part accommodates a focusing lens 89 for collimating the light beam from diode 84 and the upper portion of a light pipe 90, which is situated entirely within probe body 81. The end face of light pipe 90, which is optically connected with light-emitting diode 84, serves as the light-transmitting surface.

Preferably, light-emitting diodes are used that emit light in the infrared region. However, light-emitting diodes with radiation in another region, for instance, in the visible region, can also be used. The light-emitting diode 84 is connected in series with a thermistor 91 and is mounted together with the latter in a common housing 88 in the part which protrudes beyond the probe body 81. Housing 88 is equipped with a high-frequency connector 92. Cables shielded against high-frequency can be screwed to connectors 87 and 92. The upper part of housing 88 for light-emitting diode 84 and thermistor 91 is thermally connected with a heat sink 93 equipped with cooling fins.

Figure 9:
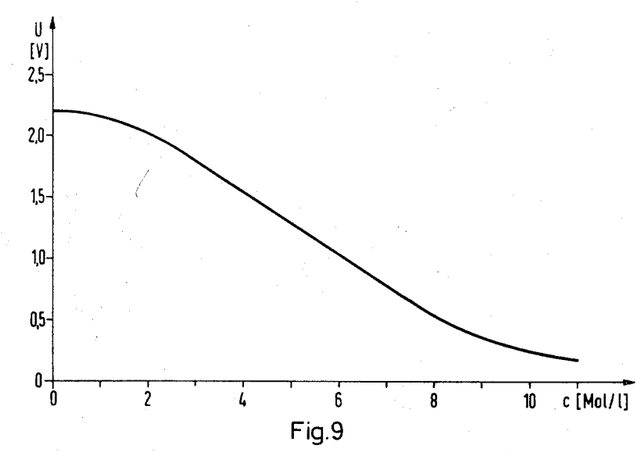
FIG. 9 is a measurement curve recorded with the probe of FIG. 8, FIGS. 10a and 10b illustrate a further probe embodiment.

FIG. 9 shows graphically a curve obtained using an opto-electronic apparatus with the probe shown in FIG. 8. Along the abscissa is the concentration $c$ of potassium hydroxide in mol/liter, and on the ordinate is the measured voltage U in volts. The measurements were performed at room temperature (22°C). The resistance of thermistor 91 at room temperature was about 300 ohms. The light-emitting diode (RCA, Type 40736 R) was operated in the pulsed mode (Frequency: 20 kHz), and the signals of the photodiode (silicon photodiode BPY 11) was evaluated with a tuned amplifier having an input resistance of 56 ohms. The photodiode was followed by a shunt resistor of 400 ohms.

The curve of FIG. 9 shows a linear relation between concentration and voltage over a wide range. The slope of the curve is about 260 mV/mol, i.e., for a concentration difference of 1 mol/liter the measured voltage difference is 260 mV.

Figure 10A:
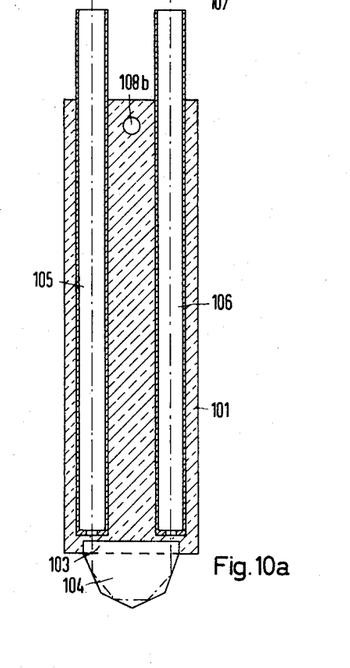
Figure 10B:
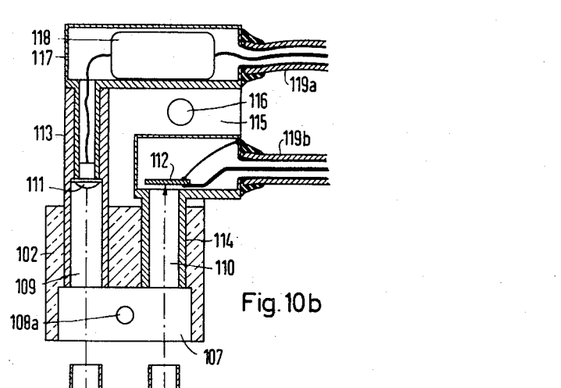

FIGS. 10a and 10b show schematically the probe of an opto-electronic apparatus according to the invention, which can be used particularly for the testing of acids, such as storage battery acid. The probe body and the probe extension are Plexiglas. The cylindrical probe body consists of two parts, a rod-shaped lower part 101 (FIG. 10a) and a plug-in part 102 (FIG. 10b). Lower part 101 has a diameter of about 15 mm and is about 50 mm long; plug-in part 102 has a diameter of about 18 mm and is about 15 mm high. A flat, multi-angled probe tip 104 is cemented into a recess 103 of the lower part 101 of the probe body. The probe extension has four reflecting surfaces and is laid out for a critical angle of total reflection of 67.5°. It extends about 1 to 2 mm into lower part 102 of the probe body, is about 12 mm wide at its base and has a height of about 6 mm, which results in an immersion depth of about 5 to 6 mm. The thickness of probe tip 104 is about 2mm. In lower part 101 of the probe body light pipes 105 and 106 are arranged in each of two canals. The light pipes extend at their lower ends almost to probe tip 104 and protrude at their upper ends beyond the lower part of the probe body. The end face of light pipe 105 adjacent to the probe tip serves as the light-transmitting surface, and the corresponding end face of the light pipe 106 as the light-receiving surface.

The plug-in part 102 of the probe body has a counterbore 107, into which lower part 101 fits. A locking pin (not shown) to hold both parts of the probe body firmly together can be inserted through a hole 108a in the plug-in part and a corresponding hole 108b in the lower part. Plug-in part 102 has two guide holes 109 and 110, into which the ends of light pipes 105 and 106, which protrude from the lower part 101, are fitted when the two parts of the probe body are assembled. The upper faces of light pipes 105 and 106 are thereby placed directly at the light-emitting diode 111 and the photodiode 112, respectively, and are optically connected with them. The guides for the light pipes in plug-in part 102 are surrounded by tubular high-frequency shields 113 and 114; shield 113 receives the light-emitting diode 111 and shield 114 the photodiode 112. The shields are placed on the plug-in part 102 and cast in place by means of casting resin to form a compact unit of about 20 mm diameter and 20 mm height. In the encapsulation 115 is arranged a hole 116, in which a heat sink, not shown, can be attached. In the common housing 117, which is part of the aforementioned compact unit, is arranged, besides the light-emitting diode 111, a thermistor 118, which is connected in series with the light-emitting diode. High-frequency lines 119a and 119b, which are cemented at the edge of the compact unit, serve as electrical leads for the light-emitting diode and the photodiode, respectively.

Figure 11:
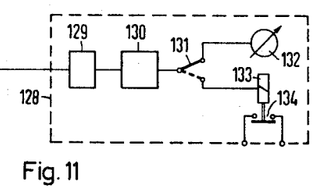
FIG. 11 is a schematic presentation of an embodiment of a complete opto-electronic apparatus according to the invention.

A complete opto-electronic apparatus according to the invention is shown schematically in FIG. 11 as a block diagram. A probe 121 of the opto-electronic apparatus can advantageously be placed on a storage battery 122 in place of a screw cap. To determine the concentration, it is sufficient if only probe tip 123 is immersed in the liquid 124 to be tested. A light-emitting diode in the probe is connected to a power supply unit 126 via a connection 125. A connection 127 leads from a photodiode in the probe to a measuring or control device, which is mounted in a common housing 128. A shunt resistor 129 is connected in parallel with the photodiode and a measuring amplifier 130 or tuned amplifier. The amplifier output can be connected by means of a switch 131 either with a meter 132 or with a relay 133. By means of the relay 133 and a switch 134 connected therewith, regulation or control, respectively, can be effected.

Figure 12:
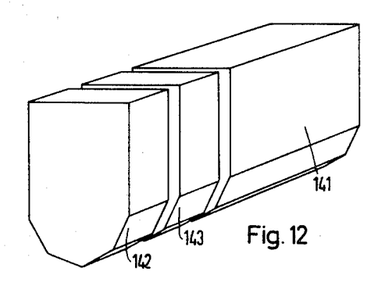
FIG. 12 shows flat, multi-angled probe tips cut from a preformed bar.

FIG. 12 shows how identical flat, multi-angled probe tips of great dimensional uniformity can be manufactured. To this end, the individual tips 142 and 143 are cut from a pre-formed bar 141 of suitable material. Prior to assembly into the probe body, the probe tips are polished at the reflecting surfaces.

As it is shown in FIG. 6 the light-transmitting surface can be also the light-emitting face of a light-emitting diode and as it is shown in FIGS. 6 and 8 the light-receiving surface can be also the light-sensitive face of a photoelectric element.

We claim:

1. Opto-electronic apparatus for determining the concentration of solutions in accordance with refractometric principles comprising:
a probe having a body with a prism tip, the tip including at least two reflecting surfaces adapted to be immersed in the solution to be examined;
light-emitting means;
a light-transmitting surface positioned in the probe body adjacent a first one of the reflecting surfaces and optically connected with the light-emitting means for directing light rays from the emitting means through the prism at an acute angle to the first reflecting surface whereby at least a portion of the incident light is reflected successively toward the other reflecting surfaces when the probe tip is immersed in the solution to be examined, the angle between successive reflecting surfaces being approximately twice the critical angle of total reflection corresponding to the material of the probe tip and the average concentration of the solution to be examined;
a light-receiving surface positioned in the probe body adjacent a last one of the reflecting surfaces, and
a light-sensitive means optically connected to the light-receiving surface and responsive to the intensity of the light rays reflected from the last reflecting surface for providing a signal having an amplitude that is a function of the concentration of the solution being examined.

2. The apparatus of claim 1 wherein the probe body is cylindrical and both the light-emitting means and the light-sensitive means are positioned within the body.

3. The apparatus of claim 1 wherein the light-emitting means is a light-emitting diode, and the light-transmitting surface is the end face of a light pipe optically connected to the light-emitting diode.

4. The apparatus of claim 1 further comprising a focusing lens positioned in the ray path between the light-emitting means and the light-transmitting surface for collimating the light beam from the light-emitting means.

5. The apparatus of claim 1 wherein the light-receiving surface is one end face of a light pipe, and the light-sensitive means is a photodiode optically connected to the other end of the light pipe.

6. The apparatus of claim 1 wherein the tip of the probe comprises a flat-sided, multi-faced prism cut from a preformed bar of material transparent to the rays from the light-emitting means and mounted on the probe body in optical contact with the light-transmitting and light-receiving surfaces.

7. The apparatus of claim 1 wherein the probe body and prism tip are integrally formed from material transparent to the rays from the light-emitting means.

8. The apparatus of claim 7 wherein the probe body and tip are formed of methacrylic acid ester.

9. The apparatus of claim 7 wherein the probe body and tip are formed of polystyrene.

10. The apparatus of claim 7 wherein the probe body and tip are formed of polysulfone.

11. The apparatus of claim 1 wherein the number of reflecting surfaces in the probe tip is such that the direction of the light rays reflected from the last reflecting surface toward the light-receiving surface is approximately reversed from the direction of the light rays incident upon the first reflecting surface from the light-transmitting surface.

12. The apparatus of claim 11 wherein the probe tip includes at least four successive reflecting surfaces so that the total deflection of the light rays from the light-transmitting surface to the light-receiving surface is at least approximately 180°.

13. The apparatus of claim 1 wherein the number of reflecting surfaces in the probe tip is such that the direction of the light rays reflected from the last reflecting surface toward the light-receiving surface is approximately perpendicular to the direction of the light rays incident upon the first reflecting surface from the light-transmitting surface.

14. The apparatus of claim 13 wherein the probe tip includes only two successive reflecting surfaces so that the total deflection of the light rays from the light-transmitting surface to the light-receiving surface is approximately 90°.

15. The apparatus of claim 13 wherein the probe tip includes six successive reflecting surfaces so that the total deflection of the light rays from the light-transmitting surface to the light-receiving surface is approximately 270°.

16. The apparatus of claim 1 wherein the probe tip comprises a plurality of multi-faced prisms arranged in cascade such that the path of the light rays reflected from successive reflecting surfaces of the prisms describes an undulating waveform.

17. The apparatus of claim 5 further comprising a measuring amplifier electrically connected to the photodiode for amplifying its output signal and an adjustable shunt resistor connected between the photodiode and the amplifier for matching the operating range of the apparatus to the concentration range of the solution to be examined.

18. The apparatus of claim 5 further comprising an alternating power source connected to the light-emitting means for operating it in the pulsed mode and a frequency responsive amplifier tuned to the frequency of the power source and electrically connected to the output of the photodiode for amplifying its output signal.

19. The apparatus of claim 3 further comprising a temperature compensating element electrically connected in series with the light-emitting diode for compensating the temperature dependence of the light intensity from the light-emitting diode.

20. The apparatus of claim 19 wherein the temperature compensating element comprises at least one thermistor.

21. The apparatus of claim 1 wherein the light-emitting means is a light-emitting diode and the light-transmitting surface is the light-emitting face of said light-emitting diode.

22. The apparatus of claim 1 wherein the light-sensitive means is a photoelectric element and the light-receiving surface is the light-sensitive face of said photoelectric element.

* * * * *